US008515748B2

(12) United States Patent
Gangemi et al.

(10) Patent No.: US 8,515,748 B2
(45) Date of Patent: Aug. 20, 2013

(54) MOBILE PHONE COMMUNICATION GAP RECOVERY

(75) Inventors: Rosario Gangemi, Lavinio (IT); Giuseppe Longobardi, Castellammare di Stabia (IT)

(73) Assignee: International Business Machines Corporation, Armonk, NY (US)

( * ) Notice: Subject to any disclaimer, the term of this patent is extended or adjusted under 35 U.S.C. 154(b) by 1233 days.

(21) Appl. No.: 12/364,921

(22) Filed: Feb. 3, 2009

(65) Prior Publication Data

US 2010/0198594 A1 Aug. 5, 2010

(51) Int. Cl.
*G10L 15/26* (2006.01)

(52) U.S. Cl.
USPC .......................................................... 704/235

(58) Field of Classification Search
USPC .......................................................... 704/235
See application file for complete search history.

(56) References Cited

U.S. PATENT DOCUMENTS

| | | | | |
|---|---|---|---|---|
| 5,857,013 | A | 1/1999 | Yue et al. | |
| 5,864,603 | A | 1/1999 | Haavisto et al. | |
| 6,122,613 | A * | 9/2000 | Baker | 704/235 |
| 6,167,251 | A | 12/2000 | Segal et al. | |
| 6,260,012 | B1 | 7/2001 | Park | |
| 6,726,636 | B2 | 4/2004 | Der Ghazarian et al. | |
| 6,820,055 | B2 * | 11/2004 | Saindon et al. | 704/270.1 |
| 6,895,257 | B2 * | 5/2005 | Boman et al. | 455/556.1 |
| 7,133,829 | B2 * | 11/2006 | Cyr et al. | 704/270.1 |
| 7,233,788 | B2 | 6/2007 | Kedem | |
| 7,539,619 | B1 * | 5/2009 | Seligman et al. | 704/277 |
| 7,836,412 | B1 * | 11/2010 | Zimmerman | 715/827 |
| 8,086,454 | B2 * | 12/2011 | Bhardwaj et al. | 704/235 |
| 8,195,457 | B1 * | 6/2012 | Lagassey | 704/235 |
| 2007/0033026 | A1 * | 2/2007 | Bartosik et al. | 704/233 |

* cited by examiner

*Primary Examiner* — Michael N Opsasnick
(74) *Attorney, Agent, or Firm* — DeLizio Gilliam, PLLC

(57) ABSTRACT

Mobile phone signals may be corrupted by noise, fading, interference with other signals, and low strength field coverage of a transmitting and/or a receiving mobile phone as they pass through the communication network (e.g., free space). Because of the corruption of the mobile phone signal, a voice conversation between a caller and a receiver may be interrupted and there may be gaps in a received oral communication from one or more participants in the voice conversation forcing either or both the caller and the receiver to repeat the conversation. Transmitting a transcript of the oral communication along with a voice signal comprising the oral communication can help ensure that voice conversation is not interrupted due to a corrupted voice signal. The transcript of the oral communication can be used to retrieve parts of the oral communication lost in transmission (e.g., by fading, etc.) to make the conversation more fluid.

20 Claims, 5 Drawing Sheets

MOBILE PHONE COMMUNICATION GAP RECOVERY

BACKGROUND

Embodiments of the inventive subject matter generally relate to the field of mobile phone communication, and more particularly, to techniques for mobile phone communication gap recovery.

Voice signals transmitted via wireless communication channels may be corrupted by noise, fading, interference with other signals, low strength field coverage of a transmitting and/or a receiving mobile phone, and other such impairments as the voice signals pass through the communication channel. Because of the corruption of the mobile phone signal, conversation may be interrupted and there may be gaps in the received voice signal forcing either or both the caller and the receiver to repeat the conversation.

SUMMARY

Embodiments include a method comprising receiving a first signal from a first communication device. The first signal comprises a received oral communication from the first communication device. A second signal, comprising a transcript of an input oral communication at the first communication device, is also received from the first communication device. The input oral communication corresponds to the received oral communication. The received oral communication is extracted from the first signal. The transcript is extracted from the second signal. A gap in the received oral communication is determined based, at least in part, on the extracted transcript. Audio data is generated to fill the gap in the received oral communication. The received oral communication is modified to incorporate the generated audio data.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to communication gap recovery for mobile phones; embodiments can also refer to communication gap recovery for other voice transmitting devices (e.g., Internet voice chat). In other instances, well-known instruction instances, protocols, structures, and techniques have not been shown in detail in order not to obfuscate the description.

A corrupted voice signal, carrying an oral communication received from one participant in a voice conversation, received by a mobile phone receiver may comprise gaps in the oral communication. Gaps in the oral communication from one participant in a voice conversation ("received oral communication") may force either or both a caller and a receiver to repeat parts of the voice conversation. Transmitting a transcript of an input oral communication along with the voice signal can help ensure that the conversation between the caller and the receiver is not interrupted due to a corrupted received voice signal. If a gap is detected in the received oral communication, the transcript of the oral communication can be used to retrieve parts of the received oral communication lost in transmission (e.g., due to fading, etc). This can minimize gaps and errors in the received oral communication and ensure that the voice conversation between the caller and the receiver is more fluid.

Figure 1:
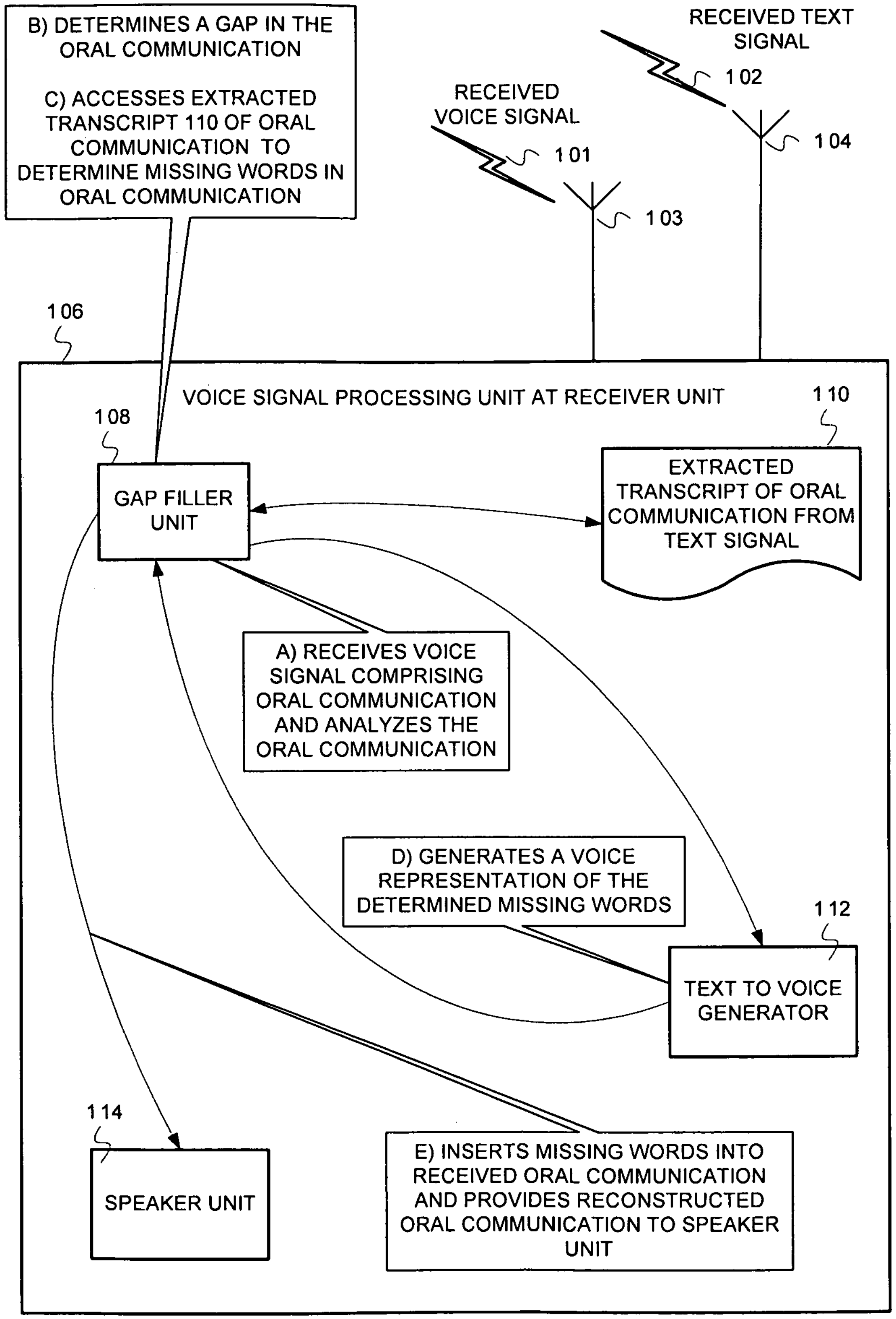
FIG. 1 is a conceptual diagram illustrating voice signal processing to detect and eliminate gaps in a received oral communication.

FIG. 1 is a conceptual diagram illustrating voice signal processing to detect and eliminate gaps in a received oral communication FIG. 1 depicts a voice signal processing unit 106 integrated with a mobile phone. The mobile phone receives two signals, a voice signal 101, and a text signal 102. The voice signal 101 comprises multiple voice packets. Each voice packet comprises a header and a payload. The voice packet payloads carry a received oral communication, from one participant in a voice conversation that can include speech, music, etc. The text signal 102 comprises multiple text packets; each text packet comprising a header and a payload. The text packet payload comprises a transcript of an input oral communication. At the transmitter, a voice to text generator generates the transcript based on the input oral communication. The voice signal and the text signal are transmitted along different channels (i.e., on different frequencies, with different protocols, etc.) to minimize communication channel effects such as interference and fading or can be transmitted on the same channel by using the same communication protocol leveraging on the text packet identification. The mobile phone receiver unit may comprise two antennas as depicted in FIG. 1. Antenna 103 is tuned to receive the voice signal 101, while antenna 104 is tuned to receive the text signal 102. In some embodiments, the mobile phone receiver unit may comprise a single antenna capable of detecting and receiving the two incoming signals. After the antennas capture the voice signal 101 and the text signal 102, the signals may be further processed (e.g., amplified, filtered, etc.) before they are received by the voice signal processing unit 106. The voice signal processing unit 106 comprises a gap filler unit 108 coupled with a text to voice generator 112 and a speaker unit 114.

At stage A, the gap filler unit 108 receives the voice signal 101 and analyzes the received voice signal. The gap filler unit 108 may receive the voice signal after initial signal processing (e.g., signal amplification). In some implementations, the gap filler unit 108 may include functionality to demodulate and decode the received voice signal and extract the received oral communication from one participant in the voice conversation ("received oral communication"). One or more signal processing units (e.g., amplifiers, demodulators, decoders, etc.) may also process the received text signal 102 and extract a received transcript of the input oral communication from one participant in the voice conversation 110 ("extracted transcript").

At stage B, the gap filler unit 108 determines that there is a gap in the received oral communication. The gap filler unit

108 interfaces with a voice to text generator (not shown) and generates a transcript of the received oral communication. At stage C, the gap filler unit 108 compares the generated transcript of the received oral communication ("generated transcript") with the extracted transcript 110 and determines that one or more words are missing from the received oral communication.

At stage D, the gap filler unit 108 directs the text to voice generator 112 to generate a voice representation of the determined missing words. At stage E, the gap filler unit 108 inserts the voice representation of the missing words into the received oral communication and generates a "reconstructed oral communication". The reconstructed oral communication may be further processed (e.g., filtered, amplified, etc.) before being transmitted to the mobile phone's speaker unit 114.

Figure 2:
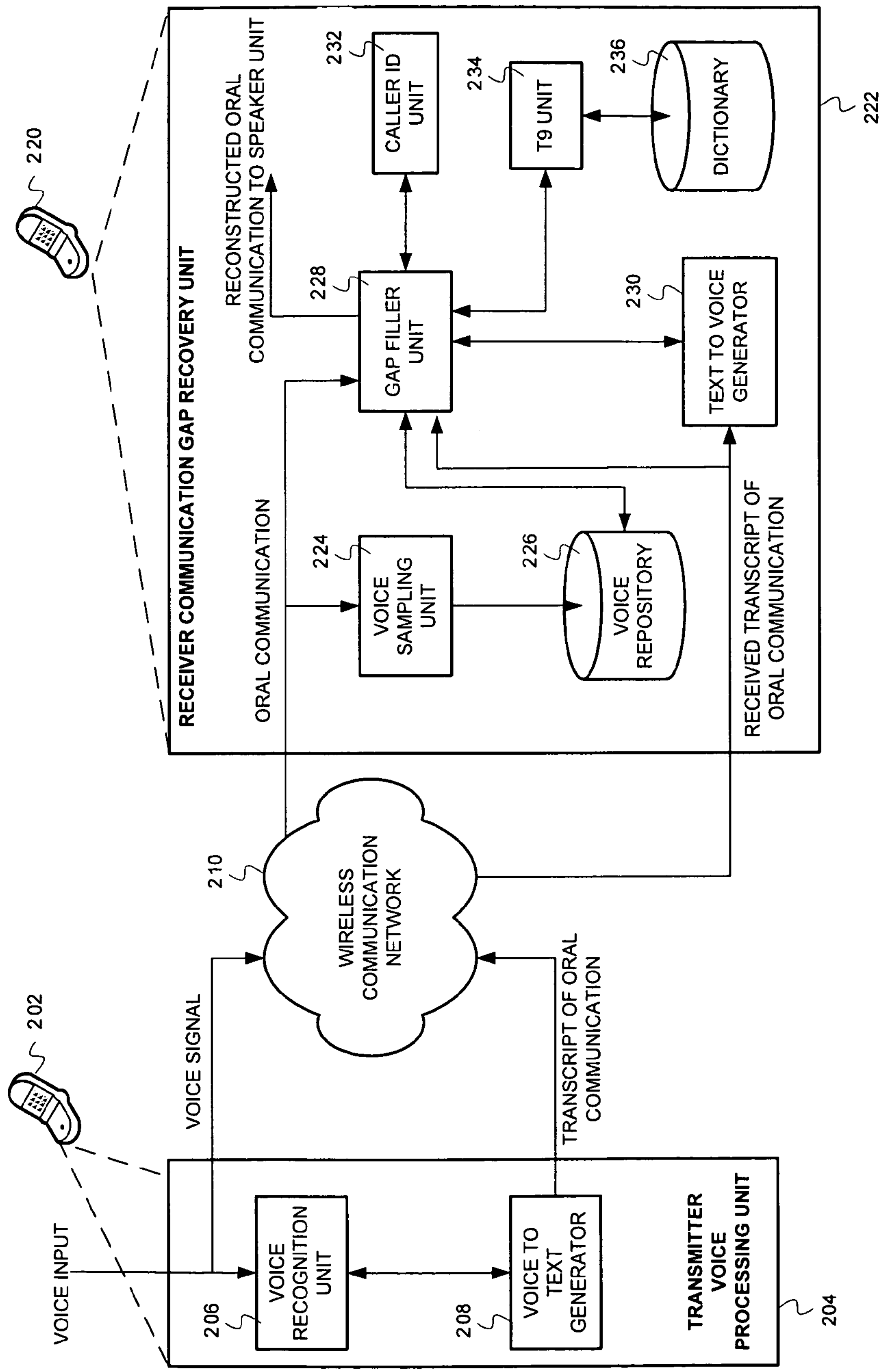
FIG. 2 is an example block diagram configured to detect and recover missing parts of a received oral communication.

FIG. 2 is an example block diagram configured to detect and recover missing parts of a received oral communication. In FIG. 2, a transmitting mobile phone 202 communicates via a wireless communication network 210 with a receiving mobile phone 220. The transmitting mobile phone 202 comprises a voice processing unit 204. The voice processing unit 204 comprises a voice recognition unit 206 coupled with a voice to text generator 208. The transmitting mobile phone 202 transmits a voice signal and a text signal. The voice signal carries an oral communication from one participant in the voice conversation and may include speech, music, etc. The text signal carries a transcript of the oral communication. The receiving mobile phone 220 receives the voice signal and the text signal. A communication gap recovery unit 222 of the mobile phone 220 processes the received signals. In the communication gap recovery unit 222, a voice sampling unit 224 and a gap filler unit 228 receive the oral communication carried by the voice signal. The voice sampling unit 224 is coupled with a voice repository 226. The gap filler unit 228 is coupled with the voice repository 226, a T9® unit 234, and a caller id unit 232. A text to voice generator 230 receives the text signal and communicates with the gap filler unit 228. Additionally, the T9 unit 234 is also coupled with a dictionary 236.

At the transmitting mobile phone 202, the voice recognition unit 206 detects a voice input and triggers the voice to text generator 208. In some implementations, the voice recognition unit 206 may be a microphone, which converts the detected analog voice input into an electrical signal. The output of the microphone may be amplified and digitized ("digitized voice input") before it is received by the voice to text generator 208. The voice to text generator 208 generates a transcript of the voice input. A Fourier Transform unit (not shown) may convert the digitized voice input from the time domain into the frequency domain. The voice to text generator 208 can analyze the frequency representation of the digitized voice input, and generate a text representation ("transcript") (e.g., using statistical analysis) of the voice input. The voice input and the transcript of the voice input are separately encoded, modulated, and transmitted along different channels across the wireless communication network 210.

At the receiving mobile phone 220, one or more antennas receive the voice signal and the text signal from the mobile phone 202. The received text signal comprises packets with the transmitted transcript of the voice input. The receiving mobile phone 220 also comprises processing units (e.g., amplifiers, filters, decoders, demodulators, etc.). These processing units process the received voice signal and extract the oral communication ("received oral communication"). The processing units also process the received text signal and extract the transmitted transcript ("extracted transcript"). The gap filler unit 228 receives the received oral communication and the extracted transcript. The gap filler unit 228 comprises a voice to text generator (not shown) to generate a transcript of the received oral communication ("generated transcript"). The gap filler unit 228 compares the extracted transcript and the generated transcript, and determines whether there are one or more missing words in the generated transcript. The gap filler unit 228 identifies the location of the missing words and directs the text to voice generator 230 to generate a voice representation of the missing words based on the extracted transcript. In some implementations, the gap filler unit 228 may provide a text representation of the missing words to the text to voice generator 230. In other implementations, the text to voice generator 230 may receive (from the gap filler unit 228) an indicator to the missing words, access the extracted transcript, and generate the voice representation of the missing words. The gap filler unit 228 receives and inserts the generated voice representation of the missing words into the received oral communication to reconstruct the initially transmitted oral communication ("reconstructed oral communication").

The voice sampling unit 224 also receives the received oral communication, samples the received oral communication, and determines characteristics (e.g., voice frequency, voice tone, etc.) associated with the received oral communication. The gap filler unit 228 queries the caller id unit 232 and determines a mobile phone number associated with the transmitting mobile phone 202. The determined voice characteristics and the corresponding mobile phone number are stored in the voice repository 226. When the gap filler unit 228 determines a gap in the received oral communication, it determines the mobile phone number associated with the transmitting mobile phone 202, accesses the voice repository 226, and retrieves voice characteristics associated with the determined mobile phone number if available. The gap filler unit 228 directs the text to voice generator 230 to use the voice characteristics to generate a more realistic voice representation of the missing words. The text to voice generator 230 generates audio data (e.g., the voice representation of the missing words based on the voice characteristics) to fill the gap in the received oral communication. This can ensure that there is little or no discernable difference between the inserted missing words and the received oral communication. The gap filler unit 228 modifies the received oral communication to incorporate the generated audio data.

If the gap filler unit 228 determines that words in the extracted transcript cannot be determined (e.g., the missing words in the extracted transcript are corrupted), the gap filler unit 228 interfaces with the T9 unit 234 and the dictionary 236 to reconstruct the missing words in the extracted transcript. After the extracted transcript is reconstructed ("reconstructed transcript"), the gap filler unit 228 compares the reconstructed transcript with the generated transcript to determine gaps in the generated transcript.

The conceptual block diagrams illustrated in FIGS. 1-2 are examples and should not be used to limit the embodiments. For example, although the gap filler unit 228 is depicted as performing operations of a voice to text generator, the communication gap recovery unit 222 may comprise a voice to text generator separate from the gap filler unit. In some implementations, the text to voice generator 230 may determine that one or more of the indicated missing words are corrupted (e.g., contain strange symbols), interface with the T9 unit 234 and the dictionary 236, determine corrected words, and generate a voice representation of the words. In some implementations, the voice sampling unit 224 may be triggered if the gap filler unit 228 cannot find the voice characteristics corresponding to the transmitting mobile phone number in the voice repository 226. In other implementations, the communication gap recovery unit 222 may not comprise a voice repository 226. The voice sampling unit 224 may determine voice characteristics every time a voice signal is received or every time a call between the transmitting mobile phone 202 and receiving mobile phone 220 is initiated. Also, although FIG. 2 depicts a T9 unit 234, the communication gap recovery unit 222 can use any suitable predictive text techniques such as iTap™ to reconstruct corrupted words in the extracted transcript.

Lastly, techniques for communication gap recovery as described in FIGS. 1-2 may be implemented in network apparatus components (e.g., radio base stations in a network cell associated with a receiving mobile phone, a server on the communication network, etc), instead of the mobile phones. For example, the radio base station associated with the receiving mobile phone may extract the oral communication and the transmitted transcript, determine whether there are missing words in the extracted oral communication, and reconstruct the initially transmitted oral communication. The radio base station may then transmit the reconstructed oral communication to the mobile phone. In some embodiments, functionality for communication gap recovery may be implemented on two or more components. For example, the radio base station may extract the transmitted transcript, determine whether the transcript is corrupted, and reconstruct the transcript. The mobile phone may receive the reconstructed transcript, determine whether there are missing words in the extracted oral communication, and reconstruct the initially transmitted oral communication.

Figure 3:
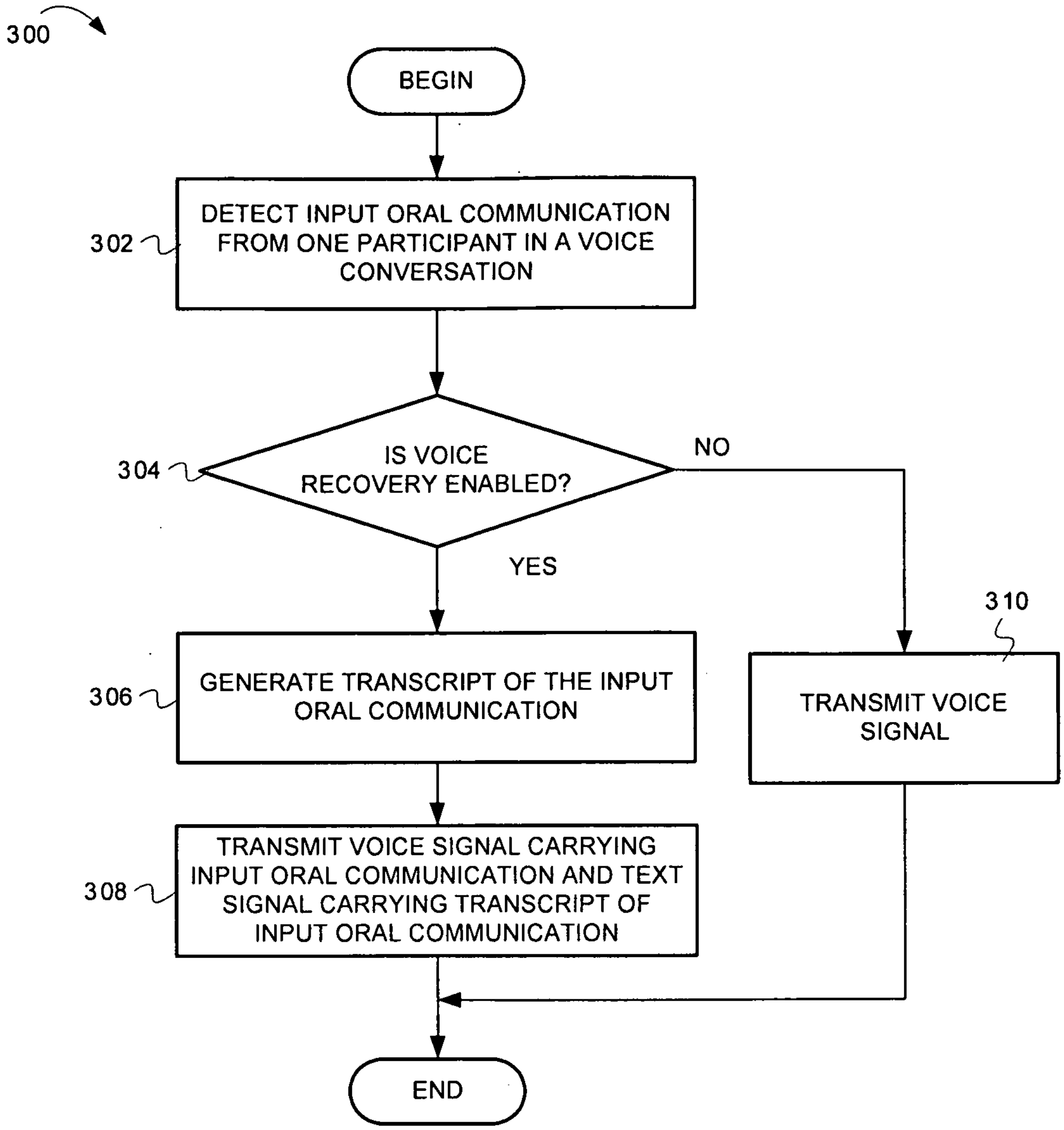
FIG. 3 is a flow diagram illustrating example operations at a mobile phone transmitter.

FIG. 3 is a flow diagram illustrating example operations at a mobile phone transmitter. The flow 300 begins at block 302.

At block 302, an input oral communication from one participant in a voice conversation is detected. A transmitting mobile phone may comprise a voice detector or a speech detector to detect the input oral communication. In some implementations, a microphone in the transmitting mobile phone may be used to detect the input oral communication. The flow continues at block 304.

At block 304, it is determined whether voice recovery is enabled. Voice recovery may comprise generating and transmitting a transcript of the input oral communication to reduce the number of interruptions in conversations because of loss of signal or corruption of signal due to a poor communication network. Users may enable or disable voice recovery depending on their tolerance of the interruptions in the conversation. If it is determined that voice recovery is disabled, the flow continues at block 310. Otherwise, the flow continues at block 306.

At block 310, the input oral communication is encoded and modulated to generate a voice signal. The voice signal is transmitted along a wireless communication channel. Because voice recovery is disabled, a transcript of the input oral communication is not generated and transmitted. Therefore, the receiving mobile phone may not implement voice recovery if words in the received oral communication from one participant in the voice conversation are missing. From block 310, the flow ends.

At block 306, a transcript of the input oral communication is generated. The input oral communication may be digitized and converted into the frequency domain. The transcript of the input oral communication may be generated by performing a statistical analysis of the frequency domain representation of the digitized input oral communication. The flow continues at block 308.

At block 308, the voice signal carrying the input oral communication and a text signal carrying the transcript of the input oral communication are transmitted. The input oral communication and the transcript of the input oral communication may be separately encoded and modulated to generate the voice signal and the text signal respectively. The voice signal and the text signal are transmitted along different channels on the wireless communication network. Transmitting the two signals along different channels (i.e., different frequencies) ensures that the communication network does not affect the two signals in the same manner. From block 308, the flow ends.

Figure 4:
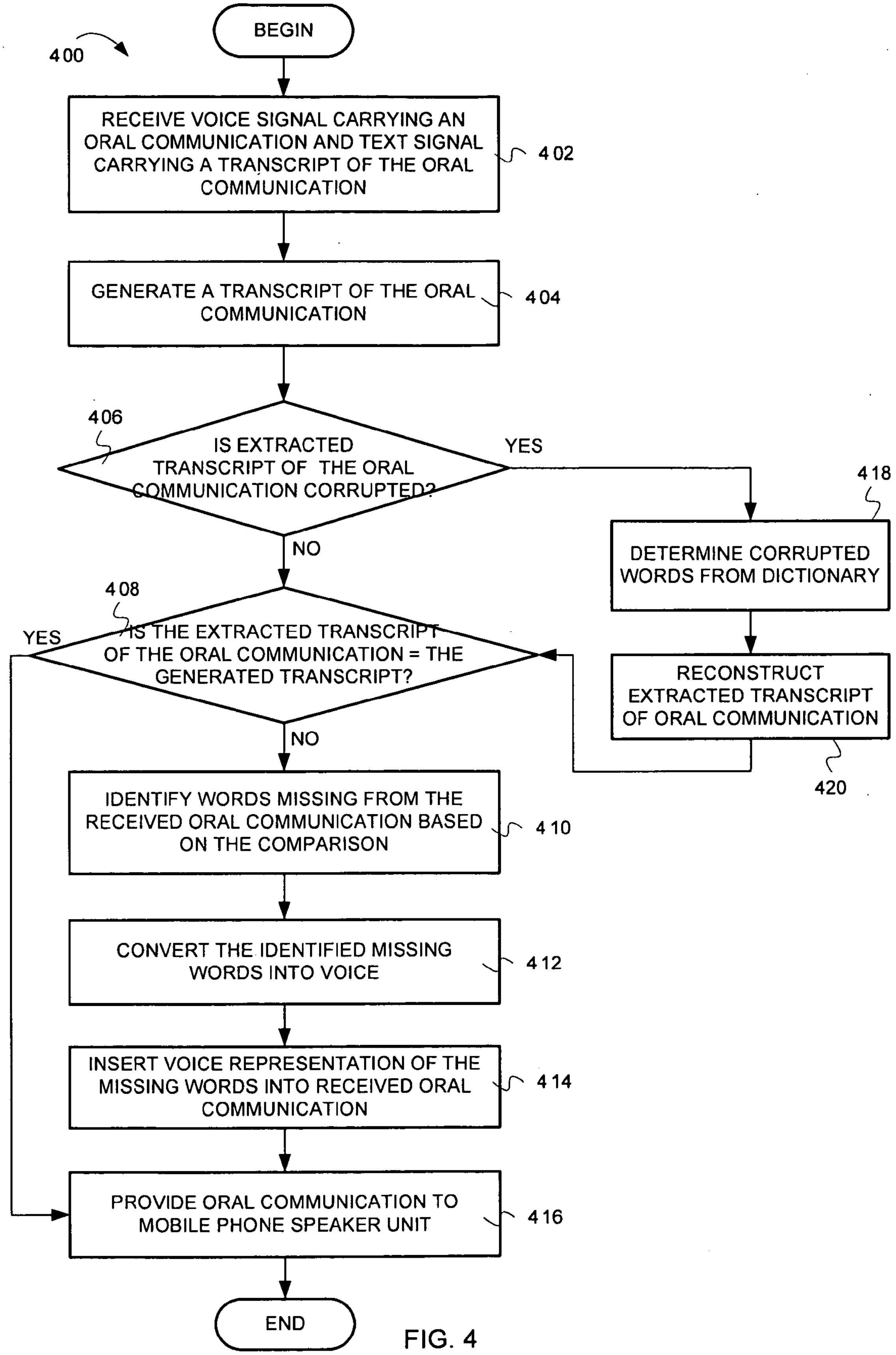
FIG. 4 is a flow diagram illustrating example operations at a receiver to detect and eliminate gaps in a received oral communication.

FIG. 4 is a flow diagram illustrating example operations at a receiver to detect and eliminate gaps in a received oral communication. The flow 400 begins at block 402.

At block 402, a voice signal carrying an oral communication and a text signal carrying a transcript of the oral communication are received. The voice signal and the text signal may be received by a single or dual antenna system on the receiving mobile phone. The received voice signal may be decoded demodulated to extract the received oral communication ("received oral communication"). The text signal may be decoded and demodulated to extract the transcript of the oral communication ("extracted transcript"). The flow continues at block 404.

At block 404, a transcript of the received oral communication is generated. The received oral communication may be processed by a voice to text generator to generate the transcript of the received oral communication ("generated transcript"). As described earlier, statistical analysis may be performed on the received oral communication to obtain the generated transcript. The flow continues at block 406.

At block 406, it is determined whether the extracted transcript of the oral communication is corrupted. The extracted transcript may be analyzed to determine whether one or more words in the extracted transcript are corrupted. Corrupted words in the extracted transcript may comprise one or more symbols and/or numbers interspersed among characters. One or more words may be missing in the extracted transcript. If it is determined that the extracted transcript is not corrupted, the flow continues at block 408. Otherwise, the flow continues at block 418.

At block 418, corrupted words in the extracted transcript are determined from a dictionary. Predictive text technologies (e.g., T9, iTap, etc.) may be used to determine the corrupted words from the dictionary. A retrieved part of a corrupted word and/or words preceding and following the corrupted word may be used to determine the corrupted word from the dictionary. Words missing from the extracted transcript may also be determined using the predictive text technologies. The flow continues at block 420.

At block 420, the extracted transcript is reconstructed. The reconstructed corrupted and missing words determined at block 418 are integrated into the extracted transcript to reconstruct the extracted transcript of the oral communication. In some implementations, it may not be possible to reconstruct the extracted transcript. For example, too many consecutive words may be missing and predictive techniques may not work. As another example, the entire transcript may be corrupted and may be discarded. The system may not reconstruct the extracted transcript if the corrupted and missing words cannot be reconstructed. From block 420, the flow continues at block 408.

At block 408, it is determined whether there is a mismatch between the extracted transcript and the generated transcript. A mismatch between the extracted transcript and the generated transcript may be determined by comparing individual words in the two transcripts (e.g., comparing strings) or by comparing ASCII characters that comprise the two transcripts. In some implementations, segments of the extracted and the generated transcripts may be converted into hashes, and the hash values associated with the extracted and the generated transcripts may be compared. In some implementations, it may first be determined whether there is a gap in the generated transcript. A gap in the generated transcript may be determined based on a threshold mechanism. For example, it may be determined that the strength of the received voice signal is below a threshold signal level. As another example, it may be determined that there is no vocal signal in the received voice signal (e.g., a presence of silence or background noise). As another example, it may be determined that the frequencies that comprise the received voice signal are outside the normal vocal frequency range. As another example, it may be determined that a received voice packet was corrupted and therefore discarded at the receiver. If it is determined that there is a mismatch between the extracted transcript and the generated transcript, the flow continues at block 410. Otherwise, the flow continues at block 416.

At block 410, missing words in the generated transcript are identified. Comparing words, ASCII characters, hashes, etc. of the generated transcript with the corresponding words, ASCII characters, hashes, etc. of the extracted transcript may identify the missing words in the generated transcript. The missing words may be identified by a word number or by a relative occurrence in time. The flow continues at block 412.

At block 412, a voice representation of the identified missing words is generated. In some implementations, the received oral communication may be sampled to determine voice characteristics (e.g., voice frequency, voice tone, etc.) associated with the received oral communication. In other implementations, the voice characteristics associated with a calling mobile phone number may be retrieved from a database. The voice characteristics may be used to generate a more realistic voice representation of the missing words. This can ensure that there is little or no discernable difference between the inserted missing words and the received oral communication. If the missing words cannot be identified (e.g., the words missing in the generated transcript are corrupted in the extracted transcript), the processing unit does not make any modifications to the received oral communication. The flow continues at block 414.

At block 414, the generated voice representation of the missing words is inserted into the received oral communication to reconstruct the initially transmitted oral communication ("reconstructed oral communication"). The generated voice representation of the missing words may be provided to the speaker unit in place of the gap in the received oral communication. The flow continues at block 416.

At block 416, the reconstructed oral communication from one participant in the voice conversation is provided to a mobile phone speaker unit of a second participant in the voice conversation. The reconstructed oral communication may be further amplified, filtered, and processed before it is transmitted to the speaker unit. From block 416, the flow ends.

It should be understood that the depicted flow diagrams (FIGS. 3-4) are examples meant to aid in understanding embodiments and should not be used to limit embodiments or limit scope of the claims. Embodiments may perform additional operations, fewer operations, operations in a different order, operations in parallel, and some operations differently. Although FIG. 3 depicts the transmitting mobile phone as having an option to enable or disable voice recovery, in some implementations voice recovery operations may be hard-coded into the mobile phone's circuitry and may be a mandatory operation. Thus, all transmitting mobile phones may be configured to transmit a transcript of the input oral communication. However, receiving mobile phones may have an option of disabling functionality for detecting and eliminating gaps in the oral communication. In FIG. 4, operations for identifying a gap in the generated transcript and determining the missing words may be performed simultaneously. Also, it should be noted that the voice conversation could comprise two or more people (e.g., a three-way call, a teleconference with multiple participants, etc). Mobile phones used by each of the participants in the voice conversation can implement functionality for detecting and eliminating gaps in the oral communication received from a transmitting participant of the voice conversation. Also, although FIGS. 3-4 describe a mobile phone as performing operations for communication gap recovery, any communication device (e.g., a radio base station, a server on the communication network, etc.) may be perform the operations for communication gap recovery.

Figure 5:
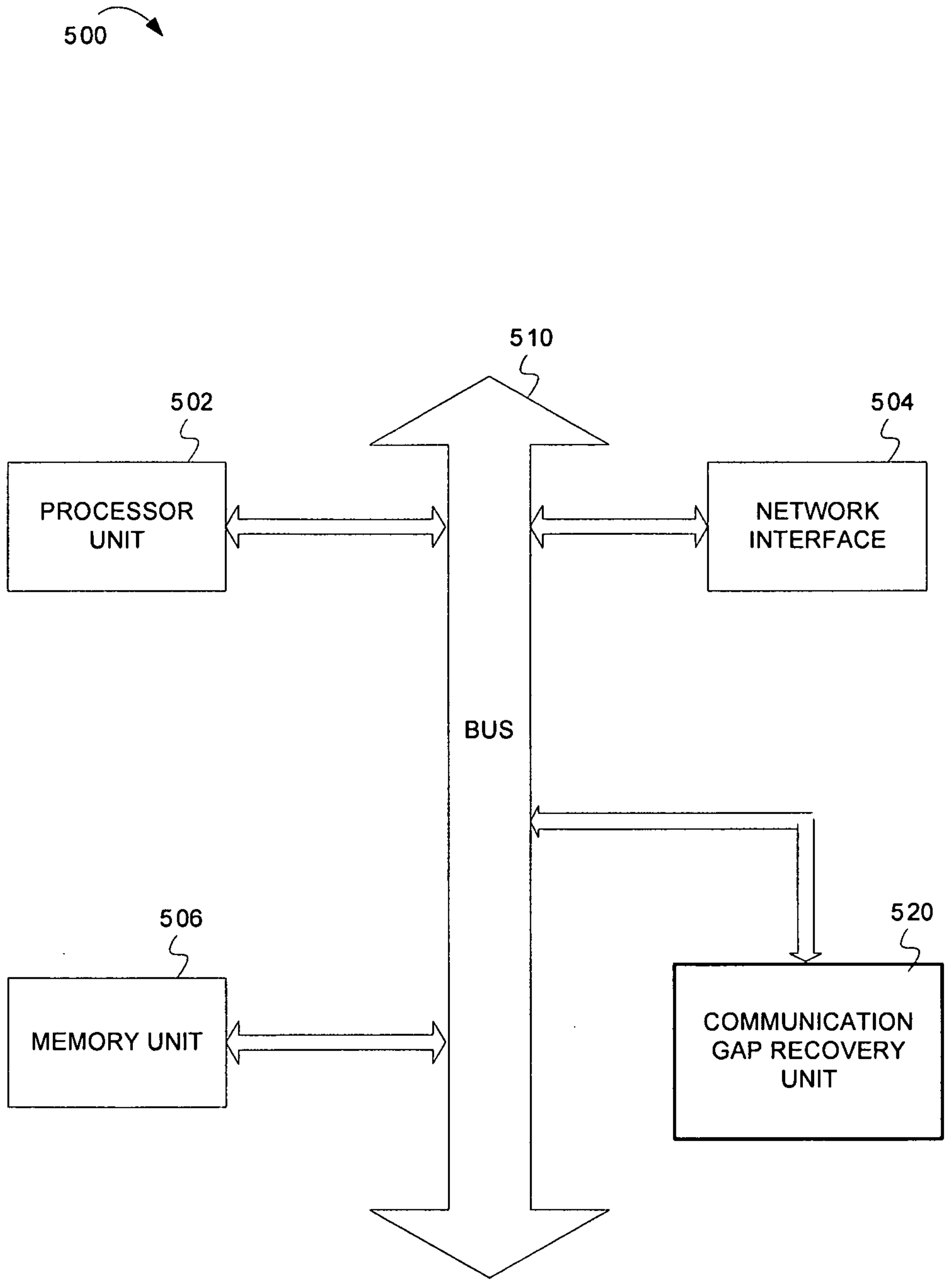
FIG. 5 depicts an example communication device including a mechanism for detecting and eliminating gaps in a received oral communication.

FIG. 5 depicts an example communication device including a mechanism for detecting and eliminating gaps in a received oral communication. In one implementation, the communication device may be a mobile phone 500. The communication device 500 may also be a radio base station, a server on a communication network, etc. The mobile phone 500 includes a processor unit 502 (possibly including multiple processors, multiple cores, multiple nodes, and/or implementing multi-threading, etc.). The mobile phone 500 includes a memory unit 506. The memory unit 506 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The mobile phone also includes a bus 510 (e.g., PCI, ISA, PCI-Express, HyperTransport®, InfiniBand®, NuBus, etc.), and network interfaces 504 that include at least one wireless network interface (e.g., a WLAN interface, a Bluetooth® interface, a WiMAX interface, a ZigBee® interface, a Wireless USB interface, etc.). The mobile phone also includes a communication gap recovery unit 520. The communication gap recovery unit 520 comprises functionalities described in accordance with FIGS. 1-4. The communication gap recovery unit 520 implements functionality for detecting a gap (e.g., one or more missing words) in an oral communication carried by a received voice signal. The communication gap recovery unit 520 also implements functionality for determining one or more missing words from a transcript of oral communication, and reconstructing the received oral communication.

Any one of the above-described functionalities may be partially (or entirely) implemented in hardware and/or on the processing unit 502. For example, the functionality may be implemented with an application specific integrated circuit, in logic implemented in the processing unit 502, in a co-processor on a peripheral device or card, etc. Further, realizations may include fewer or additional components not illustrated in FIG. 5 (e.g., additional network interfaces, peripheral devices, etc.). The processor unit 502 and the network interfaces 504 are coupled to the bus 510. Although illustrated as being coupled to the bus 510, the memory 506 may be coupled to the processor unit 502.

Embodiments may take the form of an entirely hardware embodiment, a software embodiment (including firmware, resident software, micro-code, etc.) or an embodiment combining software and hardware aspects that may all generally be referred to herein as a "circuit", "module" or "system". Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing ("machine-readable storage medium") or transmitting ("machine-readable signal medium") information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in a machine-readable signal medium, such as an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

While the embodiments are described with reference to various implementations and exploitations, it will be understood that these embodiments are illustrative and that the scope of the inventive subject matter is not limited to them. In general, techniques for mobile phone communication gap recovery as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:

receiving a first signal from a first communication device, wherein the first signal comprises a received oral communication from the first communication device;

receiving a second signal from the first communication device, wherein the second received signal comprises a transcript of an input oral communication at the first communication device and wherein the input oral communication corresponds to the received oral communication;

extracting the received oral communication from the first signal;

extracting the transcript from the second signal;

determining a gap in the received oral communication based, at least in part, on the extracted transcript;

generating audio data to fill the gap in the received oral communication; and modifying the received oral communication to incorporate the generated audio data.

2. The method of claim 1, wherein the determining the gap in the received oral communication based, at least in part, on the extracted transcript comprises:

generating a transcript of the received oral communication; and comparing the transcript of the input oral communication extracted from the second signal with the generated transcript of the received oral communication.

3. The method of claim 1, wherein the determining the gap in the received oral communication comprises determining that a signal strength associated with the first signal is below a first threshold level.

4. The method of claim 1, wherein the determining the gap in the received oral communication comprises determining that one or more voice frequencies in the first signal are outside a range of permissible voice frequencies.

5. The method of claim 1, wherein the generating audio data to fill the gap in the received oral communication comprises:

determining words that occur in the transcript of the input oral communication but are missing in the transcript of the received oral communication; and generating the audio data based, at least in part, on the words.

6. The method of claim 5, further comprising:

determining voice characteristics associated with the received oral communication; and modulating the generated audio data in accordance with the determined voice characteristics.

7. The method of claim 6, wherein the determining the voice characteristics associated with the received oral communication comprises sampling the received oral communication to determine one or more of a voice pitch, word pronunciation, and voice frequency.

8. The method of claim 6, wherein the determining the voice characteristics associated with the received oral communication comprises:

determining a contact number associated with the received oral communication; and retrieving, from a voice repository on a mobile phone, the voice characteristics associated with the contact number.

9. A method comprising:

receiving a first signal from a first communication device, wherein the first signal comprises a received oral communication from the first communication device;

receiving a second signal from the first communication device, wherein the second received signal comprises a transcript of an input oral communication at the first communication device and wherein the input oral communication corresponds to the received oral communication;
extracting the received oral communication from the first signal;
extracting the transcript from the second signal;
determining that one or more words in the extracted transcript are corrupted and cannot be deciphered;
reconstructing the one or more corrupted words in the extracted transcript;
determining a gap in the received oral communication based, at least in part, on the reconstructed transcript;
generating audio data to fill the gap in the received oral communication; and
modifying the received oral communication to incorporate the generated audio data.

10. The method of claim 9, wherein the reconstructing the one or more corrupted words in the extracted transcript comprises using predictive text techniques.

11. One or more non-transitory machine-readable storage media having stored therein a program product, which when executed by a set of one or more processor units causes the set of one or more processor units to perform operations that comprise:
receiving a first signal from a first communication device, wherein the first signal comprises a received oral communication from the first communication device;
receiving a second signal from the first communication device, wherein the second received signal comprises a transcript of an input oral communication at the first communication device and wherein the input oral communication corresponds to the received oral communication;
extracting the received oral communication from the first signal;
extracting the transcript from the second signal;
determining a gap in the received oral communication based, at least in part, on the extracted transcript;
generating audio data to fill the gap in the received oral communication; and
modifying the received oral communication to incorporate the generated audio data.

12. The non-transitory machine-readable storage media of claim 11, wherein said operation of determining the gap in the received oral communication based, at least in part, on the extracted transcript comprises:
generating a transcript of the received oral communication; and
comparing the transcript of the input oral communication extracted from the second signal with the generated transcript of the received oral communication.

13. The non-transitory machine-readable storage media of claim 11, wherein said operation of determining the gap in the received oral communication comprises determining that a signal strength associated with the first signal is below a first threshold level.

14. The non-transitory machine-readable storage media of claim 11, wherein said operation of determining the gap in the received oral communication comprises determining that one or more voice frequencies in the first signal are outside a range of permissible voice frequencies.

15. The non-transitory machine-readable storage media of claim 11, wherein said operation of generating audio data to fill the gap in the received oral communication comprises:
determining words that occur in the transcript of the input oral communication but are missing in the transcript of the received oral communication; and
generating the audio data based, at least in part, on the words.

16. The non-transitory machine-readable storage media of claim 15, wherein the operations further comprise:
determining voice characteristics associated with the received oral communication; and
modulating the generated audio data in accordance with the determined voice characteristics.

17. The non-transitory machine-readable storage media of claim 16, wherein said operation of determining the voice characteristics associated with the received oral communication comprises sampling the received oral communication to determine one or more of a voice pitch, word pronunciation, and voice frequency.

18. An apparatus comprising:
a set of one or more processors;
a network interface coupled with the set of one or more processors; and
a communication gap recovery unit configured to,
receive a first signal from a first communication device, wherein the first signal comprises a received oral communication from the first communication device;
receive a second signal from the first communication device, wherein the second received signal comprises a transcript of an input oral communication at the first communication device and wherein the input oral communication corresponds to the received oral communication;
extract the received oral communication from the first signal;
extract the transcript from the second signal;
determine a gap in the received oral communication based, at least in part, on the extracted transcript;
generate audio data to fill the gap in the received oral communication; and
modify the received oral communication to incorporate the generated audio data.

19. The apparatus of claim 18, wherein the communication gap recovery unit configured to determine the gap in the received oral communication based, at least in part, on the extracted transcript comprises the communication gap recovery unit configured to:
generate a transcript of the received oral communication; and
compare the transcript of the input oral communication extracted from the second signal with the generated transcript of the received oral communication.

20. The apparatus of claim 18, wherein the communication gap recovery unit comprises one or more machine-readable storage media.

* * * * *